US009118423B1

(12) United States Patent
Zanoni et al.

(10) Patent No.: US 9,118,423 B1
(45) Date of Patent: Aug. 25, 2015

(54) OPTICAL CONVERSION SYSTEM AND METHOD WITH MULTIPLE AMPLITUDE PROCESSING

(71) Applicants: Raymond Zanoni, Columbia, MD (US);
Kim S. Jepsen, Ellicott City, MD (US);
Oliver S. King, Frederick, MD (US);
Thomas J. Cullen, Ellicott City, MD (US)

(72) Inventors: Raymond Zanoni, Columbia, MD (US);
Kim S. Jepsen, Ellicott City, MD (US);
Oliver S. King, Frederick, MD (US);
Thomas J. Cullen, Ellicott City, MD (US)

(73) Assignee: Rockwell Collins.com, Cedar Rapids, IA (US)

( * ) Notice: Subject to any disclaimer, the term of this patent is extended or adjusted under 35 U.S.C. 154(b) by 202 days.

(21) Appl. No.: 13/963,876

(22) Filed: Aug. 9, 2013

(51) Int. Cl.
 *H03M 1/00* (2006.01)
 *H04B 10/54* (2013.01)

(52) U.S. Cl.
 CPC .................................... *H04B 10/541* (2013.01)

(58) Field of Classification Search
 CPC ................................ G02F 7/00; H04B 10/541
 USPC ........................... 341/137, 155; 398/202–214
 See application file for complete search history.

(56) References Cited

U.S. PATENT DOCUMENTS

| | | | |
|---|---|---|---|
| 4,384,291 A | 5/1983 | Lewis et al. | |
| 4,694,276 A | 9/1987 | Rastegar | |
| 4,732,447 A | 3/1988 | Wright et al. | |
| 4,928,007 A * | 5/1990 | Furstenau et al. | 341/137 |
| 4,968,986 A | 11/1990 | Wagner | |
| 5,010,346 A | 4/1991 | Hamilton et al. | |
| 5,109,441 A | 4/1992 | Glaab | |
| 5,955,875 A | 9/1999 | Twichell et al. | |
| 6,118,396 A * | 9/2000 | Song | 341/137 |
| 6,188,342 B1 | 2/2001 | Gallo | |
| 6,326,910 B1 | 12/2001 | Hayduk et al. | |
| 6,404,365 B1 | 6/2002 | Heflinger | |
| 6,404,366 B1 | 6/2002 | Clark et al. | |
| 6,420,985 B1 | 7/2002 | Toughlian et al. | |
| 6,459,522 B2 | 10/2002 | Yariv | |
| 6,469,649 B1 | 10/2002 | Helkey et al. | |

(Continued)

FOREIGN PATENT DOCUMENTS

WO  WO-2011/010314 A2  1/2011

OTHER PUBLICATIONS

Office Action on U.S. Appl. No. 13/787,202 (F&L 047141-0910) Dated Nov. 25, 2014, 19 pages.

(Continued)

*Primary Examiner* — Khai M Nguyen
(74) *Attorney, Agent, or Firm* — Angel N. Gerdzhikov; Donna P. Suchy; Daniel M. Barbieri

(57) ABSTRACT

A photonic processor can include a first input for an amplitude-modulated optical pulse signal, a second input for an optical reference signal, and a plurality of stages. Each stage is configured to receive the amplitude-modulated optical pulse signal and a version of the optical reference signal. The version is amplitude attenuated in accordance with a position of the stage. Each stage is comprised of a reference path, a signal path, two couplers and a balanced photo detector. The first coupler receives the pulse signal and provides as stage pulse signal to the signal path coupled to a first input of the detector. The second coupler receives the version and provides a stage optical reference signal to the reference path coupled to a second input of the detector. The detector provides an electronic output signal corresponding to an amplitude relationship.

20 Claims, 6 Drawing Sheets

(56) References Cited

U.S. PATENT DOCUMENTS

| | | | |
|---|---|---|---|
| 6,525,682 | B2 | 2/2003 | Yap et al. |
| 6,529,150 | B1 | 3/2003 | Shoop et al. |
| 6,567,436 | B1 | 5/2003 | Yao et al. |
| 6,661,361 | B1 | 12/2003 | Lewis et al. |
| 6,700,517 | B1 | 3/2004 | Kellar |
| 6,714,149 | B2 | 3/2004 | Nunnally |
| 6,771,201 | B1 | 8/2004 | Currie |
| 7,376,349 | B2 | 5/2008 | Ionov et al. |
| 7,389,055 | B1 | 6/2008 | Rickard et al. |
| 7,471,224 | B2 | 12/2008 | Babbitt et al. |
| 7,564,387 | B1 | 7/2009 | Vawter et al. |
| 7,570,184 | B2 | 8/2009 | Ikeda et al. |
| 7,671,771 | B2 | 3/2010 | Hirono et al. |
| 7,826,752 | B1 | 11/2010 | Zanoni et al. |
| 7,847,715 | B2 | 12/2010 | Keith |
| 7,867,246 | B2 | 1/2011 | Kim |
| 7,868,799 | B1 | 1/2011 | Price et al. |
| 7,876,246 | B1 * | 1/2011 | Price et al. ............ 341/118 |
| 7,956,788 | B2 | 6/2011 | Lee et al. |
| 7,990,299 | B2 | 8/2011 | Bell |
| 8,263,928 | B1 | 9/2012 | Efimov |
| 8,315,387 | B2 | 11/2012 | Kanter et al. |
| 8,442,402 | B1 | 5/2013 | Zanoni et al. |
| 8,446,305 | B1 | 5/2013 | Zanoni et al. |
| 8,456,336 | B1 | 6/2013 | Zanoni et al. |
| 8,466,819 | B2 | 6/2013 | Woodward et al. |
| 8,548,331 | B1 | 10/2013 | Zanoni et al. |
| 8,779,955 | B1 | 7/2014 | Zanoni et al. |
| 8,837,956 | B1 | 9/2014 | Zanoni et al. |
| 2002/0067299 | A1 | 6/2002 | Clark et al. |
| 2002/0163454 | A1 | 11/2002 | Yap et al. |
| 2006/0093375 | A1 | 5/2006 | Futami et al. |
| 2007/0159369 | A1 | 7/2007 | Currie et al. |
| 2007/0223936 | A1 | 9/2007 | Babbitt et al. |
| 2009/0236501 | A1 | 9/2009 | Takahashi et al. |
| 2010/0002281 | A1 | 1/2010 | McDonald |
| 2011/0002029 | A1 | 1/2011 | McDonald |
| 2011/0221627 | A1 | 9/2011 | Pierno et al. |
| 2011/0234435 | A1 | 9/2011 | Woodward et al. |
| 2012/0087653 | A1 | 4/2012 | Sawada et al. |
| 2012/0212360 | A1 | 8/2012 | Kanter et al. |
| 2012/0213531 | A1 | 8/2012 | Nazarathy et al. |
| 2012/0219302 | A1 | 8/2012 | Sun et al. |
| 2012/0224184 | A1 | 9/2012 | Li et al. |
| 2012/0299446 | A1 | 11/2012 | Shmilovich et al. |
| 2013/0016004 | A1 | 1/2013 | Pierno et al. |
| 2013/0077962 | A1 | 3/2013 | Wu et al. |
| 2013/0113641 | A1 | 5/2013 | Sudo et al. |
| 2013/0136450 | A1 | 5/2013 | Roberts et al. |
| 2013/0328706 | A1 | 12/2013 | Marom |
| 2014/0005966 | A1 | 1/2014 | Fireaizen et al. |

OTHER PUBLICATIONS

Non-Final Office Action on U.S. Appl. No. 14/023,338 Dated Mar. 2, 2015, 9 pages.
U.S. Appl. No. 13/536,929, filed Jun. 28, 2012, Zanoni et al.
U.S. Appl. No. 13/626,642, filed Sep. 25, 2012, Zanoni et al.
U.S. Appl. No. 13/787,202, filed Mar. 6, 2013, Zanoni et al.
Notice of Allowance for U.S. Appl. No. 13/243,208, mail date Jun. 6, 2013, 11 pages.
Office Action on U.S. Appl. No. 13/536,929 Dated Mar. 6, 2014, 10 pages.
Clark et al., Coherent Optical Phase-Modulation Link, IEEE Photonics Technology Letters, Aug. 15, 2007, 3 pages.
Clark et al., Photonics for RF Front Ends, IEEE Microwave Magazine, May 2011, 9 pages.
Valley et al., Photonic Analog-To-Digital Converters: Fundamental and Practical Limits, Integrated Optical Devices, Nanostructures, and Displays, Proceedings of SPIE, 2004, 11 pages.
Valley, Photonic Analog-to-Digital Converters, The Aerospace Corporation, 2009, 48 pages.
Valley, Photonic Analog-To-Digital Converters, The Aerospace Corporation, Mar. 5, 2007, 28 pages.
Zibar et al., Digital Coherent Receiver Employing Photonic Downconversion for Phase Modulated Radio-over-Fibre Links, downloaded on Aug. 2, 2010 from IEEE Xplore, 4 pages.
Zibar et al., Digital Coherent Receiver for Phase-Modulated Radio-Over-Fiber Optical Links, IEEE Photonics Technology Letters, Feb. 1, 2009, 3 pages.
Notice of Allowance for U.S. Appl. No. 13/204,158, mail date Jan. 29, 2013, 10 pages.
Notice of Allowance for U.S. Appl. No. 13/240,226, mail date Feb. 14, 2013, 4 pages.
Office Action on U.S. Appl. No. 13/963,899 Dated Feb. 12, 2015, 16 pages.
Final Office Action on U.S. Appl. No. 13/787,202 Dated May 19, 2015, 22 pages.
Final Office Action on U.S. Appl. No. 13/963,899 Dated May 26, 2015, 26 pages.
Kikuchi, Coherent Optical Communications: Historical Perspectives and Future Directions, 2010, High Spectral Density Optical Communication Technologies, Optical and Fiber Communication Reports, Springer-Verlag Berlin Heidelber, pp. 11-49.

* cited by examiner

OPTICAL CONVERSION SYSTEM AND METHOD WITH MULTIPLE AMPLITUDE PROCESSING

CROSS-REFERENCE TO RELATED APPLICATIONS

This application is related to U.S. patent application Ser. No. 13/963,899, titled "OPTICAL CONVERSION SYSTEM AND METHOD WITH MULTIPLE PHASE PROCESSING" filed on an even date herewith by Zanoni, U.S. patent application Ser. No. 13/787,202 titled "OPTICAL SAMPLE AND HOLD SYSTEM AND METHOD" filed Mar. 6, 2013, by Zanoni et al., U.S. patent application Ser. No. 13/240,226, titled "OPTICAL SAMPLE AND HOLD", filed on Sep. 22, 2011, by Zanoni et al., now issued U.S. Pat. No. 8,456,336 U.S. patent application Ser. No. 13/204,158 entitled "WIDE BAND DIGITAL RECEIVER: SYSTEM AND METHOD", filed on Aug. 5, 2011, by Zanoni et al., U.S. patent application Ser. No. 13/626,642 entitled "OPTICAL ANALOG-TO-DIGITAL CONVERSION SYSTEM AND METHOD WITH ENHANCED QUANTIZATION", filed on Sep. 25, 2012, by Zanoni et al., and U.S. patent application Ser. No. 13/536,929 entitled "PIPELINED RECEIVER SYSTEM AND METHOD", filed on Jun. 28, 2012, by Zanoni et al., all assigned to the Assignee of this patent application and incorporated in their entireties herein by reference.

FIELD OF THE INVENTION

The present specification relates to optical or photonic processors, including but not limited to a processor for a photonic analog-to-digital converter (pADC) in high frequency (e.g., 100+ megahertz (MHz) and multi-gigahertz (GHz) radio frequency (RF)) systems. More particularly, the present specification relates to a multi-amplitude photonic processor.

Photonic processing techniques are used in a wide variety of applications. Communication and sensing devices frequently use photonic processing based analog-to-digital conversion to convert an analog signal to a digital signal. High speed analog-to-digital conversion is utilized in high capacity optical communications, radio frequency (RF) receivers used in military, commercial and consumer applications. Products that utilize analog-to-digital signal conversion include, but are not limited to: electronic intelligence (ELINT) receivers, cell phones, wireless local area network components, radars (e.g., synthetic aperture radar (SAR)), sensors, high frequency (e.g., 100 megahertz (MHz) and multi-Giga Hertz (GHZ)) systems, coherent optical communications systems, etc.

Optical or photonic analog-to-digital converters (pADC) can reduce the size, weight, and power requirements of the systems in which they are employed. The pADC generally includes, temporal and or wavelength multiplexing/demultiplexing components, and at least one electronic analog-to-digital converter (eADC). The optical components can add to the size, weight and power usage of the optical portion of the pADC. The eADC is generally a high resolution ADC which adds to the size, weight and power usage of the electronic portion of the pADC.

Accordingly, there is a need for an analog-to-digital conversion system and method configured for reduced size, cost, weight and/or power consumption. Further still, there is a need for an improved photonic analog-to-digital converter (pADC) system and method which provides multi-amplitude demodulation. Yet further, there is a need for an ADC with a simplified optical processor that provides amplitude demodulation. Still further there is a need for a pADC that does not require a high resolution eADC. There is further a need for a pADC system and method that provides multi-amplitude signal processing. There is also a need for a flash photonic multi-amplitude converter. There is further a need for a high speed flash photonic processor for amplitude modulated signals with reduced circuit size.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a photonic processor. The photonic processor includes a first input configured to receive an amplitude-modulated optical pulse signal. The photonic processor also includes a second input configured to receive an optical reference signal. The photonic processor also includes stages. Each stage is configured to receive a version of the amplitude-modulated optical pulse signal and an amplitude attenuated version of the optical reference signal. Each stage is comprised of a reference path, a signal path, a first coupler, a second coupler and a balanced photo detector. The first coupler receives the version of the amplitude-modulated optical pulse signal and provides a stage amplitude-modulated optical pulse signal to the signal path. The signal path is coupled to a first input of the balanced photo detector. The second coupler receives the amplitude attenuated version of the optical reference signal and provides a stage optical reference signal to the reference path. The referenced path is coupled to a second input of the balanced photo detector. The stage optical reference signal is amplitude attenuated in accordance with a position of the stage. The balanced photo detector provides an electronic output signal corresponding to an amplitude relationship of the stage optical reference signal and the stage amplitude-modulated optical signal.

Another embodiment relates to a photonic processor including a first input configured to receive a phase-modulated optical pulse signal, a second input configured to receive an optical reference signal, and a number of stages. Each stage is configured to receive an amplitude-modulated optical pulse signal and an attenuated version of the optical reference signal. The attenuated version of the optical reference signal is attenuated in accordance with a position of the stage. Each stage is comprised of a reference path, a signal path, and a directional coupler coupled to the reference path and the signal path and used to compare the amplitude-modulated optical pulse signal to the amplitude reference along the optical reference stage. The stage also is comprised of a balanced photo detector that provides an electronic output signal corresponding to an amplitude relationship of the attenuated version of the optical reference signal and the amplitude-modulated optical pulse signal for the stage.

Another exemplary embodiment relates to a method of multi-amplitude processing. The method includes receiving an amplitude-modulated optical pulse signal at a plurality of stages, and receiving a respective amplitude attenuated version of an optical reference signal at the plurality of stages. The respective amplitude attenuated version of the optical reference signal is amplitude attenuated in accordance with a position of the stage. The method also includes comparing the respective amplitude attenuated version of the optical reference signal with the amplitude-modulated optical pulse signal at each stage, and providing an electronic output signal corresponding to an amplitude relationship of the amplitude attenuated optical reference signal and the amplitude-modulated optical pulse signal at each stage.

Yet another exemplary embodiment relates to a multi-amplitude photonic processor including an amplitude modulator configured to receive an electronic radio frequency signal and an optical clock signal and to provide an amplitude-modulated optical signal on a first signal path. The optical clock is provided on a second signal path. The processor also includes a first signal optical coupler for providing a first level of power of the amplitude-modulated optical signal to a first input of a first detector, and a first reference optical coupler for providing a first level of power of the optical clock signal to a second input of the first photo detector. The first photo detector is a balanced photo detector. The processor also includes a second signal optical coupler for providing a second level of power of the amplitude-modulated optical signal to a third input of a second photo detector. The second level of power of the amplitude-modulated optical signal is approximately equal to the first level of power of the amplitude-modulated optical signal. The processor also includes a second reference optical coupler for providing a second level of power of the optical clock signal to a fourth input of the second photo detector. The second level of power of the optical clock signal is less than the first level of power of the optical clock signal. The second photo detector is a balanced photo detector. The processor includes a first output associated with the first photo detector, and a second output associated with the second photo detector. The first output and the second output provide a thermometer electronic output signal corresponding to an amplitude relationship of the optical clock signal and the amplitude-modulated optical pulse signal.

BRIEF DESCRIPTION OF THE DRAWINGS

Embodiments of the invention will become more fully understood from the following detailed description, taken in conjunction with the accompanying drawings, wherein like reference numerals denote the same or similar elements and in which.

DETAILED DESCRIPTION OF THE PREFERRED EMBODIMENTS

Figure 1:
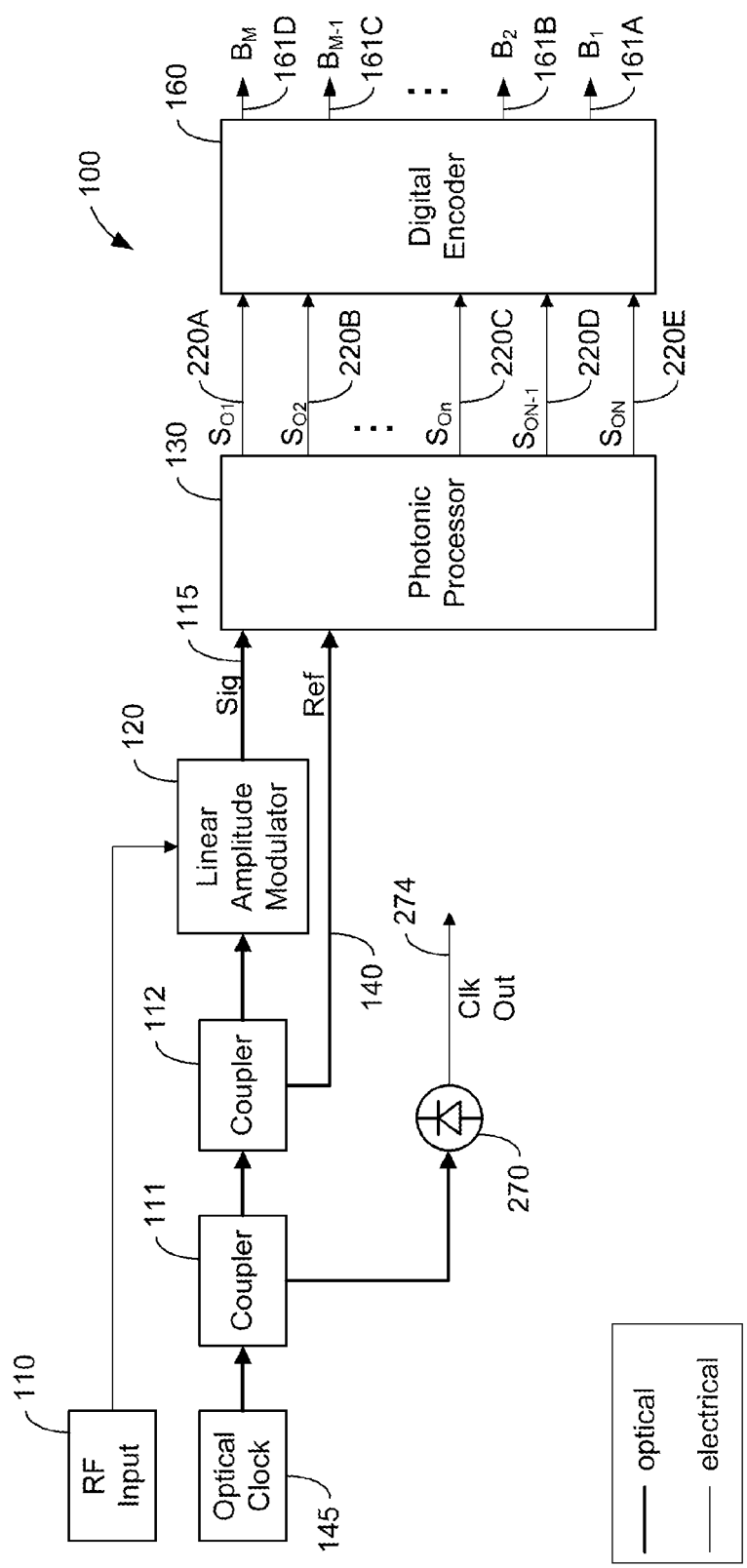
FIG. 1 is a general schematic block diagram of a photonic analog-to-digital converter (pADC) including a photonic processor according to an exemplary embodiment.

Before describing in detail the particular improved system and method, it should be observed that the invention includes, but is not limited to, a novel structural combination of components and not in the particular detailed configurations thereof. Accordingly, the structure, software, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

At least one embodiment relates to a photonic processor for use in a photonic analog-to-digital converter (pADC), for example, a pADC provided in a wide band or narrowband RF receiver. However, the pADC systems and methods of the specification can be utilized in any type of conversion applications. The pADC can be used for different types of receiving applications, including but not limited to applications associated with cellular phones, wireless devices, radios (e.g., software defined radio, radio receivers capable of wide band or narrowband receiver operations, etc.), radars (e.g., a digital radar synthetic aperture radar (SAR)), sensors, etc. Advantageously, certain embodiments of systems and methods described herein reduce the need for expensive eADCs and provide multi-amplitude demodulation.

Performing the sampling process using amplitude modulated optical pulses, as contrasted to simply relaying the RF signal to an electronic ADC for sampling, provides advantages in certain embodiments. Optical sampling allows the sampling to occur using an ultra-low jitter optical pulse source in one embodiment. Various embodiments can achieve one or more of the benefits described above.

FIG. 1 shows a photonic analog-to-digital converter (pADC) 100 according to one embodiment. In one embodiment, pADC 100 is embodied as an M-bit pADC based upon N outputs 220A-E from a photonic processor 130. N is an integer from 2 to a number where circuit design efficiency is practicable. In one embodiment, N can be 2, 3, 4, 5, 6, 7, 8, 9, . . . 16, 17, 18, 19, . . . 32, . . . 64. pADC 100 utilizes multi-amplitude demodulation and provides a thermometer type signal at outputs 220A-E (e.g., $S_{O1}$-$S_{ON}$) which can be converted to a data signal (e.g., $B_1$-$B_M$) by a digital logic circuit 160 at outputs 161A-D in one embodiment.

Although specific techniques, parameters, bit values and coordinates for the various conversion systems and methods described herein, they are not disclosed in a limiting fashion. Various adjustments to the types of signals, frequency of operation, types of modulation, etc. can be made without departing from the scope of the invention.

In one embodiment, pADC 100 includes an optical clock 145 for supplying a high repetition rate stream of optical pulses with very low clock jitter (e.g., an optical clock signal or optical reference signal). Examples of this type of device include a mode locked laser (MLL) and a coupled opto-electronic oscillator (COEO). Any type of suitable optical clock can be utilized.

In one embodiment, pADC 100 receives an RF voltage or signal V(t) at an RF input 110. The RF signal can be a modulated signal representing data. RF input 110 can be any terminal or circuit for receiving an input signal. In one embodiment, RF input 110 is coupled to a wide band antenna (not shown in FIG. 1). The input signal at RF input 110 is provided to an amplitude modulator 120, which performs amplitude modulation in response to the optical pulse signal (e.g., optical clock signal) from splitters or couplers 111 and 112 and in response to the input signal. Amplitude modulator 120 outputs an amplitude modulated optical pulse stream or signal at an output 115. Amplitude modulator 120 can be a linear amplitude modulator, such as an electro-absorption modulator.

In one embodiment, pADC 100 or processor 130 includes optical splitters or couplers 111 and 112 coupled to optical clock 145. An optical or photonic processor 130 is connected to receive signals (e.g., the amplitude modulated signal) on a signal path or output 115 from amplitude modulator 120. Photonic processor 130 is also coupled to a signal path or an output 140 associated with the optical clock signal (e.g., a reference signal) from clock 145 via couplers 111 and 112. The reference signal is coherent with the amplitude modulated signal in one embodiment.

Processor 130 provides electronic signals associated with the data associated with the RF signal V(t) in electronic format to an electronic logic circuit 160. Processor 130 can be configured as an optical amplitude demodulator in one embodiment. In one embodiment, processor 130 provides signals $S_{O1}$, $S_{O2}$, $S_{O3}$, $S_{O4}$, ..., $S_{ON}$. The electronic signals are provided to digital logic circuit 160.

In one embodiment, logic circuit 160 provides a data signal. Processor 130 and logic circuit 160 can operate as low resolution flash eADC. Using photonic processor 130 requires less power (e.g., micro watts of peak optical power) than a conventional eADC.

Digital logic circuit 160 can be embodied as an encoder, one or more logical gates, a processor, ASIC, etc. Digital logic circuit 160 provides a data signal including at least one bit. In one embodiment, circuit 160 provides bits $B_1$, $B_2$, $B_3$, $B_M$ as a data signal. The bit signals are provided as an electronic data signal. Digital logic circuit 160 is a clocked digital encoder in one embodiment and can receive an electronic clock signal converted from the optical pulse signal at output 140 in one embodiment. A photo detector 270 can be configured to provide an electronic clock output 274 for processor 130 and logic circuit 160.

According to various embodiments, pADC 100 can be utilized in a variety of applications including high capacity optical communications receivers, telecommunication receivers, Department of Defense (DOD) wide receiver technology, digital radar, sensors, etc. In one embodiment, pADC 100 can be implemented using optical and electric circuit components as described herein including processors, FPGAs, ASICS, opto-electronic circuits, etc.

Clock 145 can be an optical clock as described in U.S. patent application Ser. No. 13/240,226. As shown in FIG. 1, the signal path at output 115 and the reference path at output 140 are separate paths that do not directly intersect or directly connect with each other, but whereby both paths provide input signals to processor 130 according to one embodiment.

Processor 130 according to an embodiment as shown in FIG. 1 can operate at 8 GHz and have a bandwidth in the C-band of 1530-1550 nanometers. In one embodiment, processor 130 can be comprised of separate stages; each stage can provide one of signals $S_{O1}$-$S_{ON}$ at outputs 220A-E corresponding to an amplitude associated with the amplitude modulated signal. Reference amplitudes for the stages can be hard coded into processor 130. The optical pulse width can be 2 picoseconds.

Each stage in processor 130 can include a balanced photo detector for providing the signal at outputs 220A-E. The stages can be arranged in a ladder structure for flash ADC operation in one embodiment. In one embodiment, flash ADC structures can be building blocks for more sophisticated ADC technology such as successive approximation register (SAR) ADCs. The current output responsivity at each of outputs 220A-E ($S_{O1}$-$S_{ON}$) without waveguide losses is approximately 0.8 A/W in one embodiment.

Figure 2A:
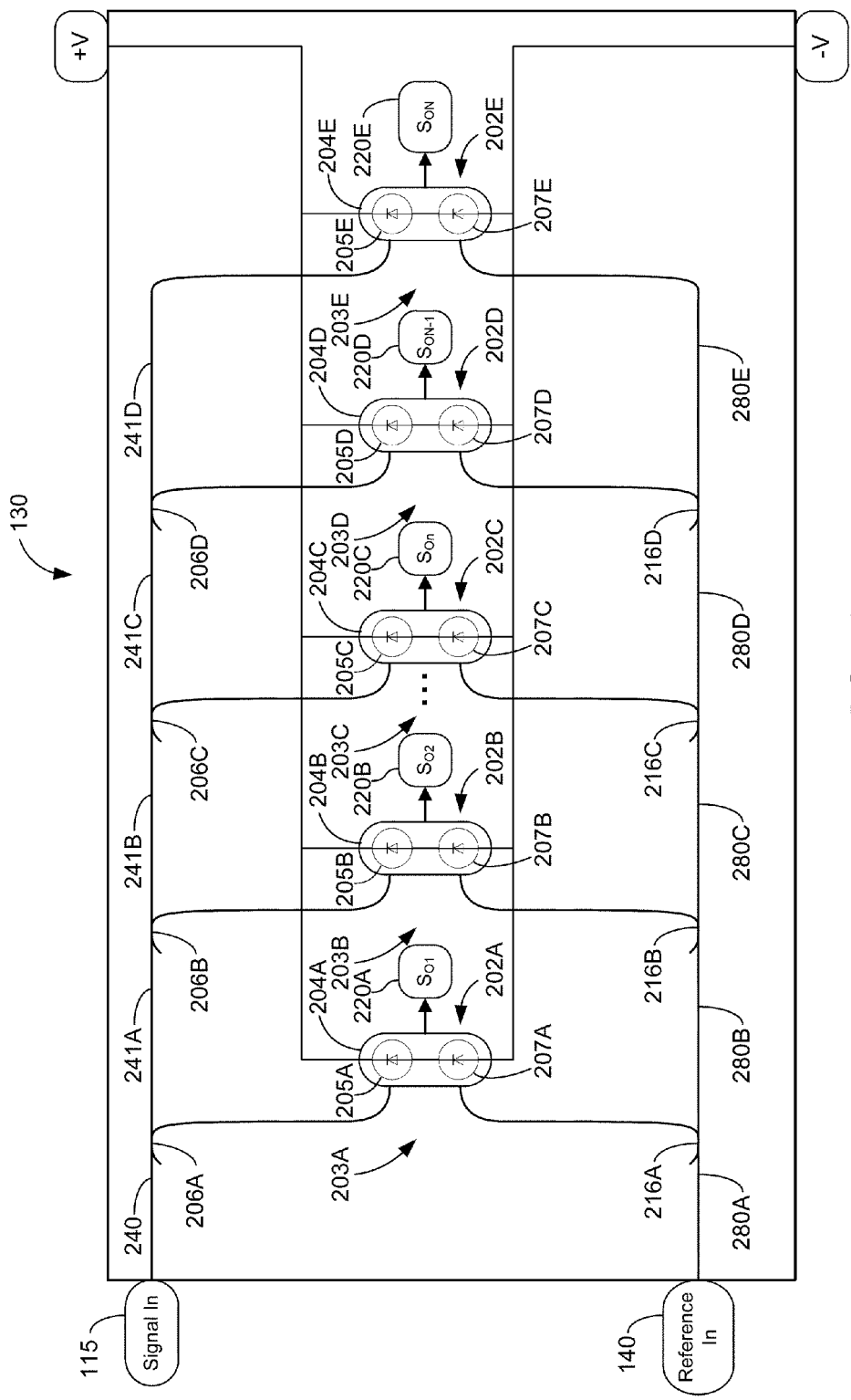
FIG. 2A is a more detailed schematic block diagram of the photonic processor for the photonic analog-to-digital converter (pADC) illustrated in FIG. 1, according to another exemplary embodiment.

With reference to FIG. 2A, an embodiment of photonic processor 130 includes a number of stages 202A-E. As discussed above, the number of stages 202A-E can be any number of stages. In one embodiment, stage 220A corresponds to stage 1, stage 220B corresponds to stage 2, stage 220C corresponds to stage n, stage 220D corresponds to stage N−1 and stage 220E corresponds to stage N. In one embodiment, n is equal to 3 and N is equal to 5, although N can be any integer 3 or more in certain embodiments. Each of stages 220A-E includes a respective output 220A-E which provides an electronic signal for reception by digital logic circuit 160 (FIG. 1) in one embodiment.

Stage 202A includes a coupler 206A and a coupler 216A. Stage 202A also includes a photo detector 204A. Couplers 206A and 216A can each have a 1550 nm optical input in one embodiment. Photo detector 204A is comprised of a photo diode 205A and a photo diode 207A. Photo detector 204A is coupled to output 220A. Each of stages 202B, C, D and E include similar elements denoted with a respective reference numeral suffix. Stages 202A-E can have an optical ladder structure using large scale nanophotonic phased array technology in one embodiment. Diodes 205A-E and 207A-E can be germanium or InGaAs photo diodes.

Coupler 206A is coupled to an optical signal path 240 coupled to output 115 which provides the amplitude modulated signal from amplitude modulator 120. Coupler 206A provides an amplitude or power associated with the amplitude modulated signal on path 240 to a signal path coupled to a first input of optical detector 204A. Coupler 216A provides an amplitude or power level of the reference signal at a reference path 280A to a reference path coupled to a second input of detector 204A. The first input of detector 204A can be associated with photo diode 205A, and the second input of photo detector 204A can be associated with photo diode 207A. Photo diodes 207A and 205A are balanced and form a balanced photo detector 204A in one embodiment.

Couplers 206A-D are configured to provide an equal power level of $P_n$ of the amplitude modulated signal provided to the first input of respective detectors 204A-E in one embodiment. In one embodiment, $P_n = P_m/N$ for all from 1 to N, where $P_m$ is the power of the amplitude-modulated signal from modulator 120. In one embodiment, n is the stage number, and N is the total number of stages.

Couplers 216A-D are configured to provide a respective power level $P_{Rn}$ for the reference signal to the second input of respective detectors 204A-E. In one embodiment, $P_{Rn}$ equals $P_R*n/(N+1)$ where n is the stage number, N is the total number of stages 202A-E and $P_R$ is a reference power level. Photo detector 204A and coupler 203A compare the power level $P_n$ of the amplitude modulated signal to a threshold power level $P_{Rn}$ using the first input of detector 204A and the second input of detector 202A to provide an electronic signal representing the amplitude level associated with the amplitude modulated optical signal at output 220A. Stages 202B-E provides similar electric signals representing the amplitude level associated with the amplitude modulated optical signal using photo detectors 202B-E.

The power level provided by each of couplers 206A-D for respective stages 202A-E is approximately equal in one embodiment. The power level on each of paths 240, and 241A-D and efficiency of each coupler 206A-D is chosen to provide the appropriate power level $P_n$. In one embodiment, the power level on each of paths 280A-E for the reference signal and the efficiency of each coupler 216A-D is chosen to provide the appropriate power level $P_{Rn}$ to respective couplers 203A-E and detectors 202A-E.

The output provided by processor 130 can be a flash/thermometer output, where the amplitude is along a length of a reference line that can be compared to a single threshold. Each of stages 202A-E provides an indication of the amplitude compared to an appropriate reference level. If the amplitude is larger than the respective reference signal, each of detectors 204A-E provides a signal at respective outputs 220A-E which is different than when the amplitude is less than the reference power level in one embodiment. Accordingly, processor 130 operates according to an amplitude ladder in one embodiment. Processor 130 can be provided as a planer lightweight circuit (PLC) have multiple stages 202A-E. Waveguides for the PLC can be mode-matched to a panda fiber.

Figure 2B:
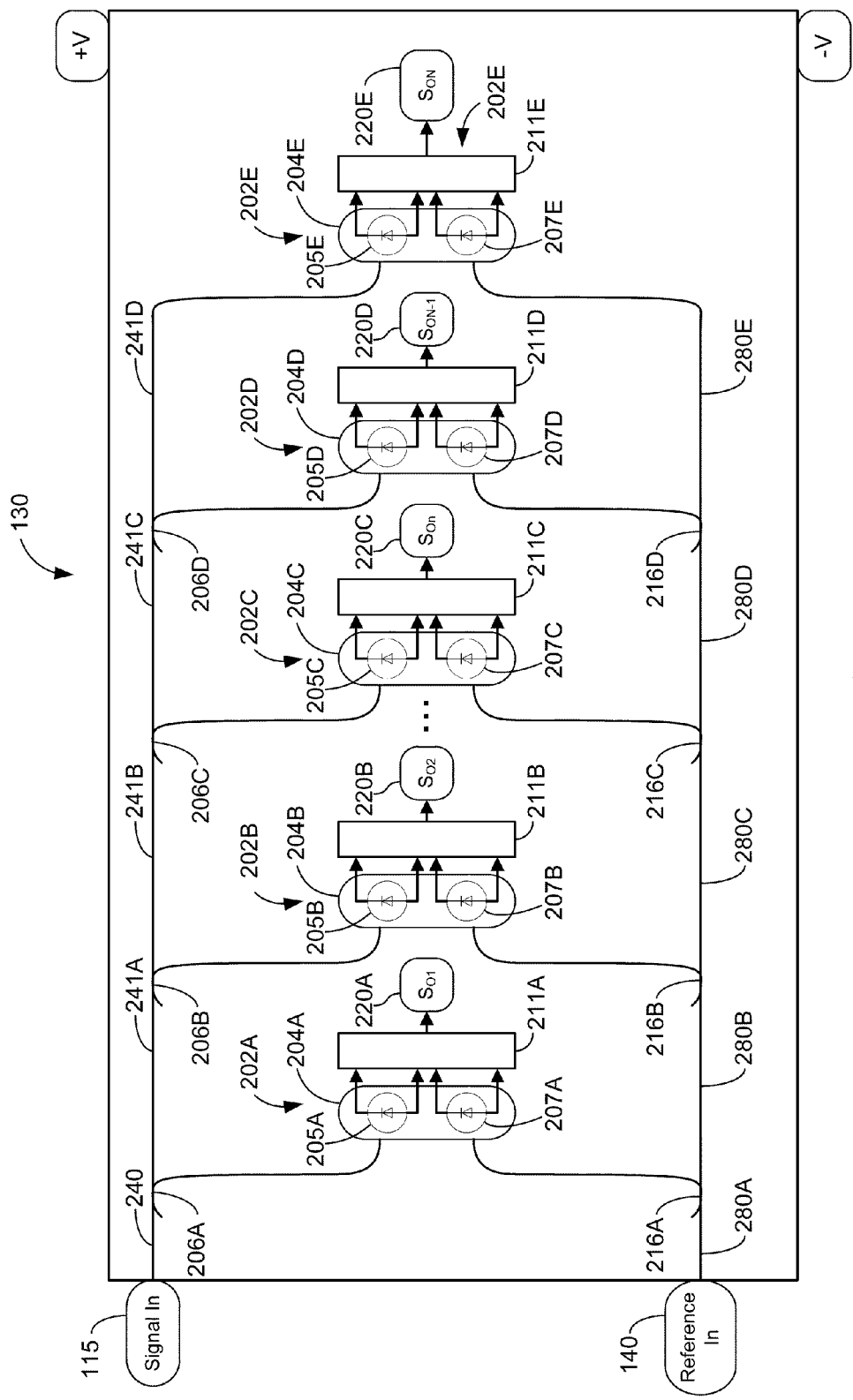
FIG. 2B is a more detailed schematic block diagram of the photonic processor for the photonic analog-to-digital converter (pADC) illustrated in FIG. 1, according to another exemplary embodiment.

With reference to FIG. 2B, an embodiment of photonic processor 130 is similar to the embodiment of photonic processor 130 discussed with reference to FIG. 2A. However, each stage 202A-E includes a receiver 211A-E for receiving for cathode and anode inputs from respective diodes 205A-E and 207A-E. Receiver 211A-E provides output signals at outputs 220A-E. In one embodiment, receivers 211A-E can be combined into a single circuit receiving inputs from each of detectors 204A-E and providing an output signal for each of outputs 220A-E.

Figure 3A:
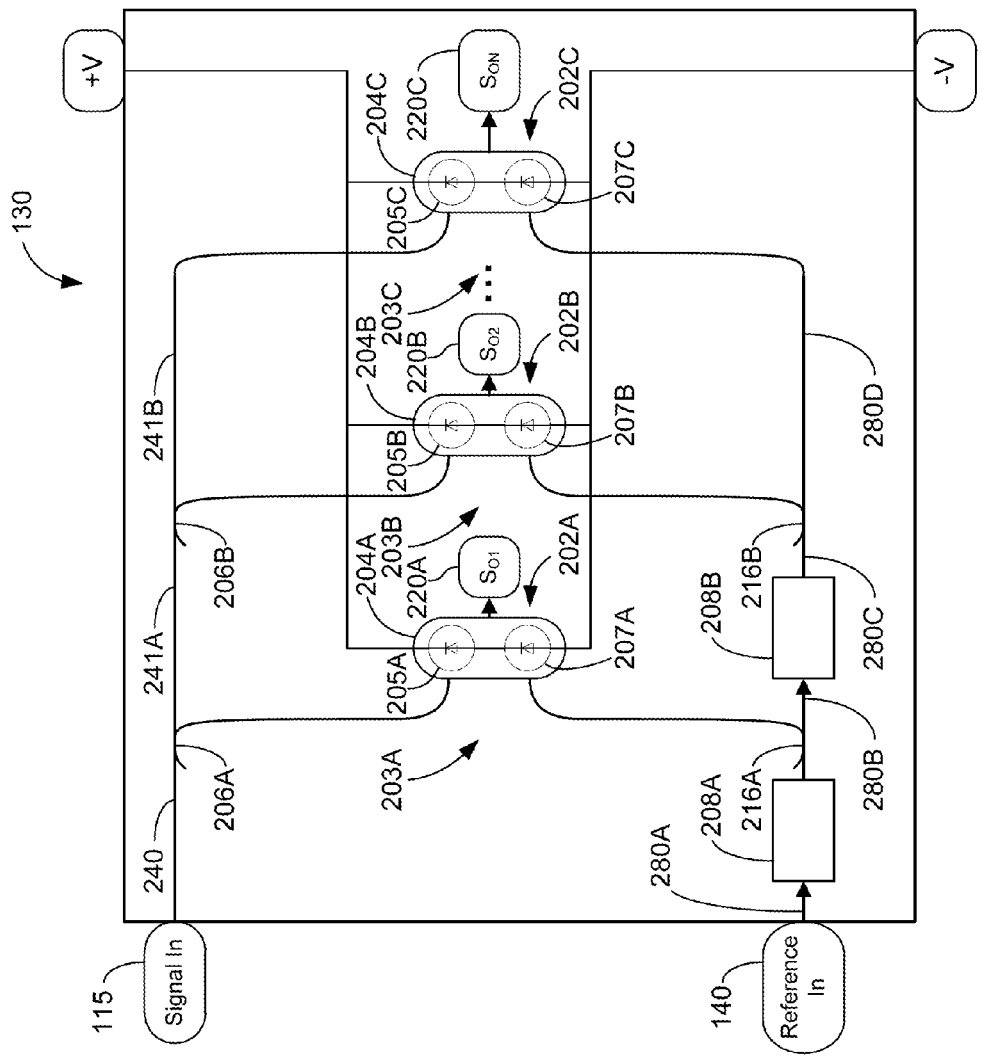
FIG. 3A is a more detailed schematic block diagram of the photonic processor for the photonic analog-to-digital converter (pADC) illustrated in FIG. 1, according to another exemplary embodiment.

With reference to FIG. 3A, an embodiment of photonic processor 130 includes a number of stages 202A-C. The number of stages 202A-C can be any number of stages. In one embodiment, stage 220A corresponds to stage 1, stage 220B corresponds to stage 2, and stage 220C corresponds to stage N. In one embodiment, N is equal to 3, although N can be any integer 3 or more in certain embodiments. Each of stages 220A-C includes a respective output 220A-C which provides an electronic signal for reception by digital logic circuit 160 (FIG. 1) in one embodiment. Processor 130 in FIG. 3A includes similar elements to processor 130 in FIG. 2A.

Coupler 206A is coupled to an optical signal path 240 coupled to output 115 which provides the amplitude modulated signal from amplitude modulator 120. Coupler 206A provides an amplitude or power associated with the amplitude modulated signal on path 240 to a signal path coupled to a first input of optical detector 204A via coupler 203A. Coupler 216A provides an amplitude or power level of the reference signal at a reference path 280A to a second input of detector 204A via coupler 203A. The first input of detector 204A can be associated with photo diode 205A, and the second input of photo detector 204A can be associated with photo diode 207A. Photo diodes 207A and 205A are balanced and form a balanced photo detector 204A in one embodiment.

Couplers 206A-B are configured to provide an equal power level of $P_n$ of the amplitude modulated signal to couplers 203A-C coupled to the first input of respective detectors 204A-C in one embodiment. Couplers 216A-B and optical attenuating elements 208A and 208B are configured to provide a respective power level $P_{Rn}$ for the reference signal couplers 203A-C to the second input of respective detectors 202A-C. In one embodiment, $P_{Rn}$ equals $P_n*n/(N+1)$, where n is the stage number and N is the total number of stages 202A-C. In one embodiment, elements 208A and 208B are fixed attenuators providing attenuation of −1.25 dB and −1.30 dB, respectively. However, any attenuator levels are possible. Attenuator levels are related to the number of stages in one embodiment. An attenuating element can be provided between element detector 202C and 208B in one alternative embodiment. Photo detector 204A and coupler 203A compare the power level $P_n$ of the amplitude modulated signal to a threshold power level $P_{Rn}$ from coupler 216A to provide an electronic signal representing the amplitude level associated with the amplitude modulated optical signal at output 220A. Stages 202B-C provides similar electric signals representing the amplitude level associated with the amplitude modulated optical signal using photo detectors 202B-C.

The power level provided by each of couplers 206A-B for respective stages 202A-C is approximately equal in one embodiment. The power level on each of paths 240, and 241A-B and efficiency of each coupler 206A-B is chosen to provide the appropriate power level $P_n$. In one embodiment, attenuation elements 208A-B and the efficiency of each coupler 216A-B is chosen to provide the power level $P_{Rn}$ to respective couplers 203A-C and detectors 202A-C on paths 280B-D.

Optical attenuating elements element 208A can be part of stage 202A, part of a reference path 280A, part of a reference path 280B, or part of coupler 216A. Optical attenuating element 280B can be part of stages 202B-C and paths 280B-C. Optical attenuating elements 208A-B can include a respective trim or adjust inputs.

Figure 3B:
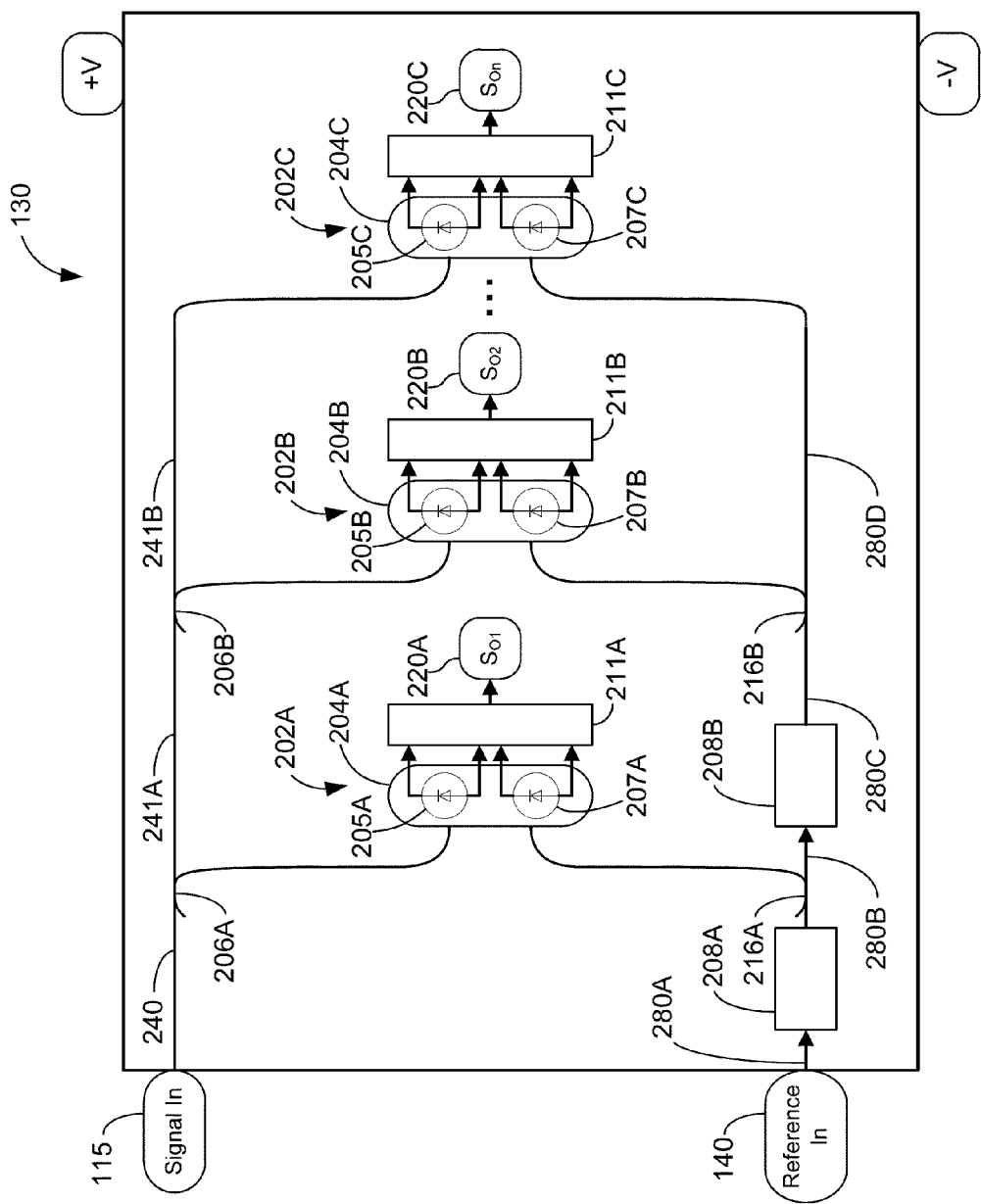
FIG. 3B is a more detailed schematic block diagram of the photonic processor for the photonic analog-to-digital converter (pADC) illustrated in FIG. 1, according to another exemplary embodiment.

With reference to FIG. 3B, an embodiment of photonic processor 130 is similar to the embodiment of photonic processor 130 discussed with reference to FIG. 3A. Each stage 202A-C includes a respective receiver 211A-C for receiving inputs from the cathodes and anodes of respective diodes 205A-C and 207A-C. Receivers 211A-C provide output signals at outputs 220A-C.

Figure 4:
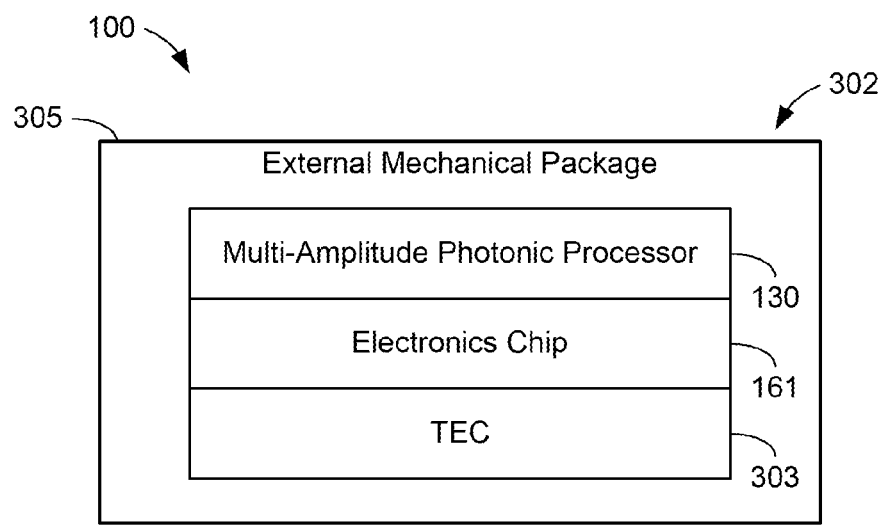
FIG. 4 is a side view schematic representation of a package for the photonic analog-to-digital converter illustrated in FIG. 1, according to yet another exemplary embodiment.

With reference to FIG. 4, a package 302 for pADC 100 can include an external mechanical package 305 which surrounds multi-amplitude photonic processor 130, an electronics chip 161 for electronics portions of processor 130 and circuit 160, and a thermo electric cooler 303. Electronics chip 161 is preferably next to the thermal electric cooler 303. In one embodiment, heterogeneously integrated silicon platform for package 300 and pADC 100 can lower power dissipation, lower parasitics, lower manufacturing costs, and allow phase shifts, attenuation elements, path lengths, etc. to be hard coded in lithography.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Also, while an optical conversion with balanced detectors system and method have been described above with respect to inclusion in a wide band or a narrow-band receiver, it can be implemented in other types of high-frequency band receivers, such as receivers operating up to hundreds of GHz. Various changes may be made to the details disclosed without departing from the spirit of the invention which is defined by the following claims

What is claimed is:

1. A photonic processor, comprising:
   a first input configured to receive an amplitude-modulated optical pulse signal;
   a second input configured to receive an optical reference signal;
   a plurality of stages, each stage being configured to receive the amplitude-modulated optical pulse signal and an attenuated version of the optical reference signal, the attenuated version of the optical reference signal being attenuated in accordance with a amplitude position of the stage, wherein each stage is comprised of:
   a reference path;
   a signal path; and
   a balanced photo detector, wherein the balanced photo detector provides an electronic output signal corresponding to an amplitude relationship of the amplitude version of the optical reference signal and the amplitude-modulated optical pulse signal for the stage.

2. The photonic processor according to claim 1, wherein each stage includes an optical attenuation circuit for providing the amplitude-attenuated version of the signal, wherein the stages form a ladder to compare the amplitude modulated optical signal to a series of reference amplitudes in order to assess amplitude.

3. The photonic processor according to claim 2, wherein the balanced photo detector is at least one pair of photo diodes.

4. The photonic processor according to claim 2, wherein each optical attenuation circuit attenuates by an amount using uniformly changing amplitudes corresponding to a number of the stages, wherein a range of amplitudes along the reference path in the ladder covers a full scale range.

5. The photonic processor according to claim 1, wherein a power level of the stage optical reference signal is provided at the reference path at each stage according to the following equation:

$$P_{Rn} = P_R * n/(N+1),$$

where $P_{Rn}$ is the power level of the stage reference signal, n is the position of the stage, $P_R$ is a power related to the optical reference signal, and N is the total number of stages.

6. The photonic processor according to claim 1, wherein the a power level of the stage optical reference signal is provided at the reference path of each stage according to a linear relationship and the power level of the stage amplitude-modulated signal is equal at each of the stages.

7. A method of multi-amplitude processing, the method comprising:
   receiving an amplitude-modulated optical pulse signal at a plurality of stages;
   receiving a respective amplitude attenuated version of an optical reference signal at the plurality of stages, the respective amplitude attenuated version of the optical reference signal being amplitude attenuated in accordance with a position of the stage;
   comparing the respective amplitude attenuated version of the optical reference signal with the amplitude-modulated optical pulse signal at each stage; and
   providing an electronic output signal corresponding to an amplitude relationship of the amplitude attenuated optical reference signal and the amplitude-modulated optical pulse signal at each stage.

8. The method according to claim 7, wherein the comparing step uses a pair of photo diodes in each stage.

9. The method according to claim 8, wherein the pair of photo diodes is a balanced pair.

10. The method according to claim 9, wherein the electronic output signal is provided as a thermometer output.

11. The method according to claim 7, wherein the respective amplitude attenuated version of the optical reference signal for each stage is provided by an optical attenuator element or by using an appropriate coupler strength.

12. The method according to claim 11, wherein amplitude-modulated signal received at each stage has approximately the same power.

13. A multi-amplitude photonic processor, comprising:
   an amplitude modulator configured to receive an electronic radio frequency signal and an optical clock signal and to provide an amplitude-modulated optical signal on a first signal path, wherein the optical clock is provided on a second signal path;
   a first signal optical coupler for providing a first level of power of the amplitude-modulated optical signal to a first input of a first photo detector;
   a first reference optical coupler for providing a first level of power of the optical clock signal to a second input of the first photo detector, the first photo detector being a balanced photo detector;
   a second signal optical coupler for providing a second level of power of the amplitude-modulated optical signal to a third input of a second photo detector, the second level of power of the amplitude-modulated optical signal being approximately equal to the first level of power of the amplitude-modulated optical signal;
   a second reference optical coupler for providing a second level of power of the optical clock signal to a fourth input of the second photo detector, the second level of power of the optical clock signal being less than the first level of power of the optical clock signal, the second photo detector being a balanced photo detector;
   a first output associated with the first photo detector; and
   a second output associated with the second photo detector;
   wherein the first output and the second output provide a thermometer electronic output signal corresponding to an amplitude relationship of the optical clock signal and the amplitude-modulated optical pulse signal.

14. The multi-amplitude photonic processor according to claim 13, further comprising:
   a third photo detector arranged in a ladder configuration with the first photo detector and the second photo detector.

15. The multi-amplitude photonic processor according to claim 14, further comprising:
   a third signal optical coupler for providing a third level of power of the amplitude-modulated optical signal to a fifth input of the third photo detector; and
   a third reference optical coupler provides a third level of power of the optical clock signal to a sixth input of the third photo detector, the third photo detector being a balanced photo detector.

16. The multi-amplitude photonic processor according to claim 15, further comprising an attenuating element.

17. The multi-amplitude photonic processor according to claim 15, wherein the processor is part of a photonic analog-to-digital converter.

18. The multi-amplitude photonic processor according to claim 17, wherein the first coupler, the second coupler and the third coupler are provided on input waveguides matched to PANDA fiber.

19. The multi-amplitude photonic processor according to claim 13, wherein the amplitude modulator is a linear amplitude modulator.

20. The multi-amplitude photonic processor according to claim 13 wherein the processor is fabricated using a large scale nanophotonic phased array.

* * * * *